Feb. 2, 1965 A. J. ROSS 3,167,932
EVAPORATOR FOR A LIQUID FREEZING APPARATUS
Filed May 18, 1962
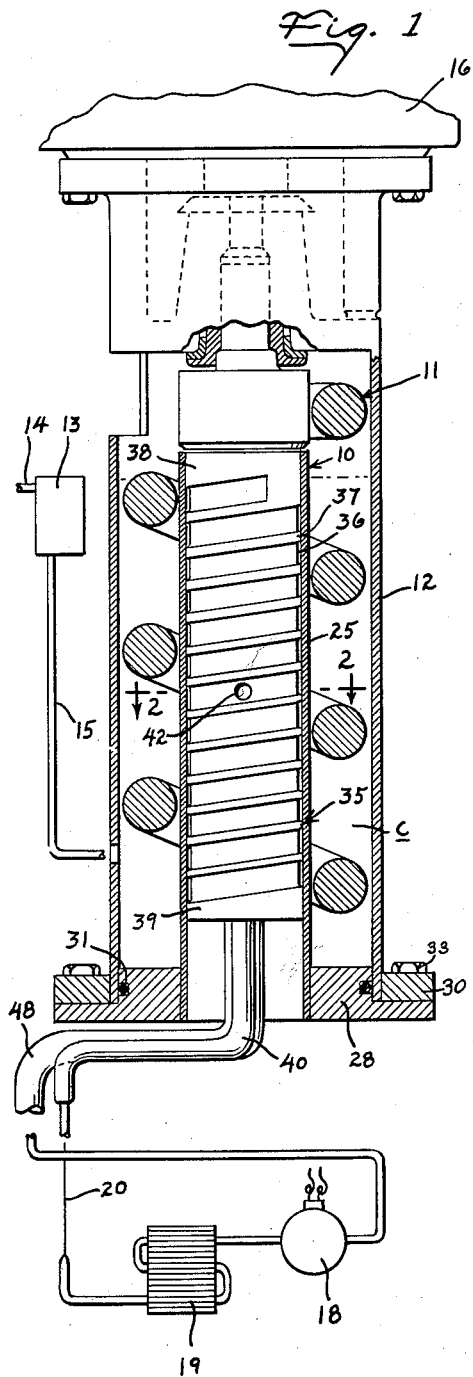
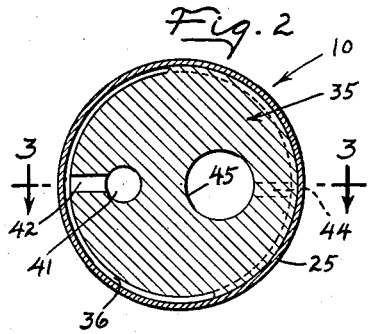
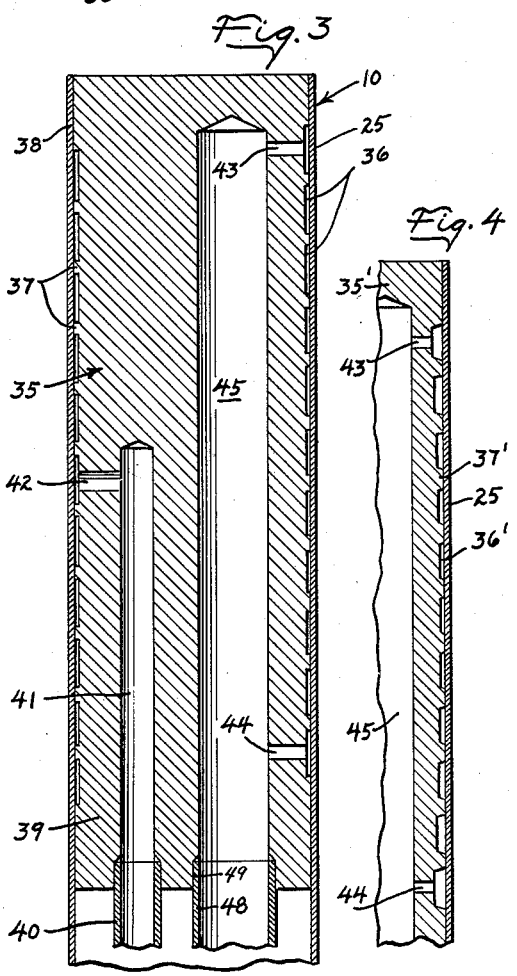
Inventor
Anthony J. Ross
By McCanna, Morsbach & Pillote
Atty's United States Patent Office 3,167,932
Patented Feb. 2, 1965

3,167,932
EVAPORATOR FOR A LIQUID FREEZING
APPARATUS
Anthony John Ross, 116 Myrtle Ave., Elmhurst, Ill.
Filed May 18, 1962, Ser. No. 195,726
4 Claims. (Cl. 62—354)

This invention relates to improvements in liquid freezing apparatus and particularly to an apparatus for producing a flake ice product.

The present invention relates generally to liquid freezing apparatus of the type having an annular freezing wall and a rotary ice removing device for removing frozen liquid from the freezing wall. As disclosed in my copending application Serial No. 157,519, filed December 6, 1961, the overall ice output of a liquid freezing apparatus can be increased and the load variations on the ice remover drive motor markedly reduced, when the freezing wall is cooled substantially uniformly over its entire surface. The present invention relates to a modified form of evaporator for such a liquid freezing apparatus.

An important object of this invention is to simplify the construction of the evaporator for the ice making apparatus while yet achieving cooling of the freezing wall substantially uniformly over its entire surface.

Another object of this invention is to provide an evaporator construction which achieves improved heat transfer between the refrigerant and the freezing wall to minimize the area of the freezing wall required to enable the ice making apparatus to produce ice at a given rate.

A more particular object of this invention is to provide an improved evaporator for a liquid freezing apparatus and which confines the flow of refrigerant to a thin film along the freezing wall to achieve more rapid heat transfer between the refrigerant and the freezing wall.

These, together with other objects and advantages of this invention will be more readily appreciated as the same becomes better understood by reference to the following detailed description when taken in connection with the accompanying drawings wherein:

FIG. 1 is a longitudinal sectional view through a liquid freezing apparatus having the improved evaporator applied thereto;

FIG. 2 is a fragmentary transverse sectional view through the evaporator taken on the plane 2—2 of FIG. 1;

FIG. 3 is a longitudinal sectional view through the plane 3—3 of FIG. 2; and

FIG. 4 is a fragmentary sectional view through a modified form of evaporator.

The ice making apparatus of the present invention is intended for use in producing a flake ice product and includes an evaporator 10 defining a breezing wall and an ice removing device 11 for removing frozen liquid from the freezing wall. A means including a water jacket 12 is provided for maintaining a quantity of water in contact with the freezing wall to be frozen thereon, and, as diagrammatically shown in FIG. 1, water is maintained at a preselected level in the jacket 12 under the control of a float valve 13. The float valve has an inlet 14 and is connected through a line 15 to the water jacket. As is conventional, the float valve is disposed at a level adjacent the upper end of the freezing wall to maintain the freezing wall substantially immersed in the liquid. The ice removing device is of the annular tube which is rotatable relative to the freezing wall and is driven by a drive motor 16. The evaporator is cooled by a conventional refrigerating apparatus which, as diagrammatically illustrated, includes a compressor 18, condenser 19 and an expansion control 20 which was advantageously in the form of a capillary tube.

The evaporator 10 is preferably of the internal type which is immersed in the liquid in the jacket 12 and, as shown, includes an annular or drum shaped freezing wall 25. The freezing wall is advantageously formed of tubular stock and is attached to the outer water jacket 12 in any suitable manner to form a liquid storage chamber C therewith. As shown, a stepped head 28 is attached to the freezing wall and extends outwardly into engagement with the water jacket. A gasket 31 such as an O-ring is provided to seal the interface between the head and the water jacket. As will be noted, the water jacket is removably mounted on the head 28 and has a ring 30 on its lower end attached to the head as by fasteners 33, so that the water jacket can be removed from around the evaporator for cleaning or repairs.

In accordance with the present invention, provision is made for controlling the flow of refrigerant along the freezing wall in such a manner that the refrigerant passes in a thin film along the freezing wall to provide intimate contact between the refrigerant and the freezing wall and to inhibit the accumulation of a layer of lubricating oil on the freezing wall which could retard heat transfer. In the internal type evaporator shown, an inner member 35 is disposed inside the freezing wall. The inner member and freezing wall have shallow refrigerant flow passages 36 formed at the interface therebetween and advantageously, the passages are in the form of shallow grooves which preferably extend in helical fashion along the outer surface of the inner member 35. The freezing wall is made relatively thin for improved heat transfer and the inner member and freezing wall are preferably assembled with a press or heat shrink fit so that the inner member aids in radially supporting the outer freezing wall. The lands 37 between the grooves 36 in the inner member engage the outer freezing wall to prevent the refrigerant from short circuiting the grooves and to also radially support the freezing wall. The upper and lower ends 38 and 39 of the inner member are sealed to the outer freezing wall, as by silver solder or the like.

As the liquified refrigerant expands and contains more and more vapor, the rate at which it will absorb heat decreases. In order to render the cooling action more uniform along the length of the freezing wall, provision is made for feeding refrigerant to the refrigerant flow passages 36 intermediate the ends of the freezing wall, and for passing the refrigerant in relatively opposite directions to outlets adjacent opposite ends of the freezing wall. As shown in FIGS. 1 and 3, a refrigerant inlet passage 41 extends into the inner member 35 and has a counterbore at its lower end connected to an inlet tube 40. The passage 41 communicates with an inlet opening 42 in the inner member located preferably substantially medially between the ends of the groove 36. Outlet openings 43 and 44 extend through the inner member and communicate opposite ends of the groove 36 with an outlet passage 45 formed in the inner member. The capillary tube 20 is advantageously connected to the inlet tube 40 externally of the ice making head to avoid damage to the capillary tube due to the accumulation of frost and the like. An outlet tube 48 extends into a counterbore 49 in the outlet passage 45 and is otherwise connected to the inlet of the compressor 18, to return the gaseous vapor to the compressor.

The rate of flow of refrigerant to the evaporator is determined by the expansion control such as the capillary tube 20 and the cross-sectional area of the flow passages 36 is made such that the combined flow area of the flow passage 36 in both directions from the inlet 42 is greater than the flow capacity of the capillary tube to allow expansion of the refrigerant as it passes through the flow passage 36. The outlet openings 43 and 44 are the same size and are at least equal to the flow area of the flow passage with which it communicates so as to pass the expanded refrigerant back to the accumulator chamber 45.

As disclosed in the aforementioned application, the helical flow passages are effective to distribute the flow of refrigerant along the inner side of the freezing wall. It has been found, however, that markedly improved operation is achieved by making the flow passages very shallow and sufficient to confine the flow of refrigerant to a thin film along the inner side of the freezing wall to provide more intimate contact between the refrigerant and the freezing wall and to inhibit the accumulation of a layer of lubricating oil on the inner surface of the freezing wall which would tend to retard heat transfer. The capillary tubes which are used in many refrigerating systems to control the flow of refrigerant to the evaporator, generally have an internal opening of the order of .040 to .060". The depth of the flow passages 36, measured in a direction transverse to the freezing wall, is made very shallow and substantially less than the internal diameter of such capillary tubes and, preferably, the grooves have a depth of the order of .010 to .030". The width of the grooves, measured in a direction along the freezing wall must be correlated with the depth of the grooves to provide adequate flow area for the refrigerant. For example, in the evaporator illustrated in FIG. 1 having an outer diameter of about 1 inch and an effective length of about 3½ inches, it has been found that a groove having a depth of about .015 inches and a width of about .190 inches provides improved heat exchange. With this particular evaporator, the inlet opening had a diameter of .080 inches and the outlet openings had a diameter of about .040 inches. Because of the small size of the grooves and openings, the evaporator is shown twice full size in FIGS. 2 and 3 to illustrate details of construction. It is considered that by using such very shallow grooves, intimate contact between the liquid portion of the refrigerant and the freezing wall is assured so that substantially complete expansion of the refrigerant in a small evaporator surface area is achieved. In addition, the refrigerant will flow at a very high velocity through these restricted evaporator flow passages while it is simultaneously undergoing expansion to a vapor and this produces a scouring action which prevents accumulation of lubricating oil on the inner wall of the evaporator.

A modified form of evaporator construction is illustrated in FIG. 4 and like numerals are utilized to designate corresponding parts while modified parts are indicated by the suffix ('). In this embodiment, an inner member 35' is disposed inside the freezing wall 25 and has the refrigerant inlet and outlets connected thereto in the manner previously described. In this embodiment, however, the grooves 36' are preferably formed with a progressively increasing cross-sectional area from the inlet port located intermediate the ends of the freezing wall to the outlets 43 and 44 at opposite ends thereof. As shown therein, the increasing cross-sectional area of the passages is achieved by increasing the depth of the grooves in a progressive fashion from the inlet toward the outlet ends of the grooves, it being understood that the cross-sectional area could also be increased by increasing the width of the grooves while maintaining the depth substantially constant. While the grooves are herein shown cut into the outer surface of the shell, it is to be understood that the grooves 36 or 36' could be formed on the inner surface of the freezing wall if desired.

I claim:

1. In an apparatus for freezing liquids including an evaporator having a freezing wall, means for supplying liquid to one side of said wall, and an ice removing device for removing frozen liquid from said one side of said wall; the improvement which comprises, means defining a generally helical refrigerant flow passage extending along the other side of said freezing wall, said flow passage having a single refrigerant inlet intermediate the ends of the freezing wall and a pair of refrigerant outlets, one adjacent each end of the freezing wall, and means including a single expansion control device for supplying expansible refrigerant to said inlet for flow in opposite directions along the freezing wall to the outlets.

2. In an apparatus for freezing liquids including an evaporator having a freezing wall, means for supplying liquid to one side of said wall, and an ice removing device for removing frozen liquid from said one side of said wall; the improvement which comprises, means defining a generally helical refrigerant flow passage extending along the other side of said freezing wall, said flow passage having a single refrigerant inlet intermediate the ends thereof and a pair of refrigerant outlets, one adjacent each end of the refrigerant flow passage, means including a flow restricting capillary tube connected to said inlet for supplying refrigerant thereto, said flow passage having a depth measured in a direction transverse to said freezing wall which is less than the internal diameter of the capillary tube and a width measured in a direction along said freezing wall which is substantially greater than the internal diameter of the capillary tube to provide intimate contact between the refrigerant flowing through said flow passage and the freezing wall for improved heat transfer.

3. In an apparatus for freezing liquids including an evaporator having a drum-shaped freezing wall, means for supplying liquid to the outer side of said wall, and an ice removing device disposed around said freezing wall for removing frozen liquid therefrom; the improvement comprising, an inner member disposed inside said freezing wall, means extending between said inner member and said freezing wall defining a generally helical refrigerant flow passage extending along the inside of said freezing wall, said refrigerant flow passage having a single inlet port intermediate the ends of the freezing wall and a pair of refrigerant outlet ports, said outlet ports being located adjacent opposite ends of the freezing wall, and means including refrigerant supply and return passages in said inner member respectively communicating with said inlet and outlet ports for passing an expansible refrigerant to said inlet port for flow in relatively opposite directions along said freezing wall to both outlet ports.

4. In an apparatus for freezing liquids including an evaporator having a drum-shaped freezing wall, means for supplying liquid to the outer side of said wall, and an ice removing device disposed around said freezing wall for removing frozen liquid therefrom; the improvement comprising, an inner member disposed inside said freezing wall, means extending between said inner member and said freezing wall defining a generally helical refrigerant flow passage extending along the inside of said freezing wall, said refrgierant flow passage having a single inlet port intermediate the ends of the freezing wall and a pair of refrigerant outlet ports, said outlet ports being located adjacent opposite ends of the freezing wall, and means including refrigerant supply and return passages extending into said inner member and respectively communicating with said inlet and outlet ports for passing an expansible refrigerant to said inlet port for flow in relatively opposite directions along said freezing wall to both outlet ports, said refrigerant flow passage having a depth measured in a direction transverse to said freezing wall which is small as compared to the width measured in a direction along the freezing wall and in a range between .01 and .03 inch to provide intimate contact between the refrigerant flowing through said flow passage and said freezing wall.

References Cited in the file of this patent

UNITED STATES PATENTS

| | | |
|---|---|---|
| 1,978,424 | Gebhard | Oct. 30, 1934 |
| 2,306,602 | Harrington | Dec. 29, 1942 |
| 2,503,395 | Leboeuf | Apr. 11, 1950 |
| 2,575,374 | Walsh | Nov. 20, 1951 |
| 2,610,478 | Lofstedt | Sept. 16, 1952 |
| 2,772,860 | Nelson | Dec. 4, 1956 |
| 2,860,490 | Taylor | Nov. 18, 1958 |
| 2,952,141 | Nelson | Sept. 13, 1960 |
| 3,092,978 | Lorentzen | June 11, 1963 |

FOREIGN PATENTS

| | | |
|---|---|---|
| 220,263 | Australia | Feb. 12, 1959 |